(12) United States Patent
Lee et al.

(10) Patent No.: US 8,472,536 B2
(45) Date of Patent: Jun. 25, 2013

(54) METHOD OF CONTROLLING IN A WIRELESS COMMUNICATION SYSTEM HAVING MULTIPLE ANTENNAS

(75) Inventors: Wook Bong Lee, Anyang-si (KR); Su Nam Kim, Anyang-si (KR); Jae Wan Kim, Anyang-si (KR); Dong Guk Lim, Anyang-si (KR); Bin Chul Ihm, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 883 days.

(21) Appl. No.: 12/588,850

(22) Filed: Oct. 29, 2009

(65) Prior Publication Data

US 2010/0118997 A1 May 13, 2010

Related U.S. Application Data

(60) Provisional application No. 61/109,511, filed on Oct. 30, 2008, provisional application No. 61/110,601, filed on Nov. 2, 2008, provisional application No. 61/151,161, filed on Feb. 9, 2009.

(30) Foreign Application Priority Data

Apr. 6, 2009 (KR) .................. 10-2009-0029430

(51) Int. Cl.
*H04K 1/10* (2006.01)
*H04L 27/28* (2006.01)

(52) U.S. Cl.
USPC ........... 375/260; 375/296; 375/299; 375/347; 375/285; 375/346; 455/500; 455/101; 455/114.2; 370/252; 370/330; 370/436

(58) Field of Classification Search
USPC ................ 375/260, 285, 296, 267, 299, 347, 375/346; 455/500, 101, 114.2; 370/252, 330, 370/436
See application file for complete search history.

(56) References Cited

U.S. PATENT DOCUMENTS 7,961,640 B2 * 6/2011 Prakash et al. ............... 370/252
2005/0063339 A1 * 3/2005 Jeong et al. .................. 370/331

(Continued)

FOREIGN PATENT DOCUMENTS

JP 2010-528553 A 8/2010
KR 10-2006-0038812 5/2006

(Continued)

OTHER PUBLICATIONS

Ericsson et al., "Final details on codebook subset restrictions", 3GPP TSG-RAN Meeting #54bis, Prague, CZ, Sep. 29-Oct. 3, 2008, R1-083746.

(Continued)

*Primary Examiner* — Phuong Phu
(74) *Attorney, Agent, or Firm* — McKenna Long & Aldridge LLP (57) ABSTRACT

A method of controlling interference in a wireless communication system is disclosed. A method for controlling interference by a transmitter of a wireless communication system with multiple antennas comprises generating a base codebook subset including at least one precoding matrix selected from a base codebook; transmitting a base codebook subset indication, which represents the at least one precoding matrix included in the base codebook subset, to a receiver; and precoding data using the base codebook subset or the base codebook.

16 Claims, 4 Drawing Sheets

U.S. PATENT DOCUMENTS

| | | | |
|---|---|---|---|
| 2007/0165738 A1* | 7/2007 | Barriac et al. | 375/267 |
| 2007/0265037 A1* | 11/2007 | Pan et al. | 455/563 |
| 2007/0297529 A1* | 12/2007 | Zhou et al. | 375/267 |
| 2008/0080634 A1* | 4/2008 | Kotecha et al. | 375/267 |
| 2008/0192717 A1* | 8/2008 | Kent et al. | 370/342 |
| 2008/0298482 A1* | 12/2008 | Rensburg et al. | 375/260 |
| 2009/0046801 A1* | 2/2009 | Pan et al. | 375/267 |
| 2009/0067375 A1* | 3/2009 | Wong et al. | 370/329 |
| 2009/0129501 A1* | 5/2009 | Mehta et al. | 375/299 |
| 2012/0250751 A1* | 10/2012 | Kim | 375/227 |

FOREIGN PATENT DOCUMENTS

| | | |
|---|---|---|
| KR | 10-2007-0079788 | 8/2007 |
| KR | 10-2008-0040543 | 5/2008 |
| WO | WO 2007/133564 A2 | 11/2007 |
| WO | WO 2008/085096 A1 | 7/2008 |

OTHER PUBLICATIONS

Huawei et al.,"Correction to CQI/PMI/RI reporting field", 3GPP TSG-RAN-WG1 Meeting #55bis, Ljubljana, Slovenia, Jan. 12-16, 2009, R1-090475.

Huawei,"DL Coordinated Beam Switching for Interference management in LTE-Advanced", 3GPP TSG RAN WG1#54, Jeju, Korea, Aug. 18-22, 2008, R1-083236.

* cited by examiner

METHOD OF CONTROLLING IN A WIRELESS COMMUNICATION SYSTEM HAVING MULTIPLE ANTENNAS

CROSS-REFERENCE TO RELATED APPLICATIONS

This application claims the benefit of the Korean Patent Application No. 10-2009-0029430, filed on Apr. 6, 2009, which are hereby incorporated by reference as if fully set forth herein.

This application also claims the benefit of U.S. Provisional Application Ser. Nos. 61/109,511, filed on Oct. 30, 2008, 61/151,161, filed on Feb. 9, 2009, and 61/110,601, filed on Nov. 2, 2008, the content of which is hereby incorporated by reference herein in their entirety.

BACKGROUND OF THE INVENTION

1. Field of the Invention

The present invention relates to a wireless communication system, and more particularly to a method of controlling interference in a wireless communication system.

2. Discussion of the Related Art

Multi-Input Multi-Output (MIMO) technology improves efficiency of data transmission and receipt using a multiple transmission antenna and a multiple receipt antenna.

While a receiver receives data through a single path if a single antenna is used, a receiver receives data through multiple paths if a multiple antenna is used. Thus, speed and capacity of data transmission is improved and coverage is enlarged.

Generally, there are an open-loop multiple antenna system in which a transmitter doesn't use feedback information from a receiver and a closed-loop multiple antenna system in which a transmitter uses feedback information from a receiver in multiple antenna systems. In a closed-loop multiple antenna system, a receiver transmits feedback information about channel status to a transmitter and the transmitter detects channel status through it so that performance of a communication system is improved.

A transmitter multiplies data by precoding matrix and transmits the data. Thus, transmission signal (y) which is transmitted through a multiple antenna by a transmitter is represented as Equation 1.

$$y = Wz \quad \text{[Equation 1]}$$

Herein, W is an element of a predetermined codebook, and z is a signal outputted from a MIMO encoder. z is as equation 2 when it is encoded with a spatial frequency block coding (SFBC) and a spatial time block coding (STBC). And, z is as equation 3 when a MIMO encoder uses spatial multiplexing or rank and stream is 1.

$$z = \begin{bmatrix} s_1 & -s_2^* \\ s_2 & s_1^* \end{bmatrix} \quad \text{[Equation 2]}$$

$$z = \begin{bmatrix} s_1 \\ s_2 \\ \vdots \\ s_R \end{bmatrix} \quad \text{[Equation 3]}$$

In equations 2 and 3, indexes of rows are stream indexes. Indexes of columns are subcarrier indexes in case of space frequency block coding, and indexes of columns are time indexes in case of space time block coding.

In a closed-loop multiple antenna system, a receiver selects a precoding matrix from a predetermined codebook and transmits an index of the selected precoding matrix to a transmitter. Then, the transmitter multiplies data by the selected precoding matrix and transmits the data. In a open-loop multiple antenna system, a receiver does not transmit a feedback for a precoding matrix, and a transmitter precodes data using precoding matrixes of a predetermined codebook rotationally.

However, when precoding and/or beamforming technology is used, a precoding matrix or beamformer may give interference to neighbor cells. Signal receipt performance of a receiver is depreciated because of the interference.

SUMMARY OF THE INVENTION

As previously stated above, the related art has a problem that signal receipt performance of a receiver is depreciated because of the interference of precoding matrixes of neighbor cells.

An object of the present invention is to provide a method for controlling interference, which can improve performance of a wireless communication system.

An object of the present invention is to provide a method for controlling interference, which can reduce interference from neighbor cells.

Technical subject matters to be realized by embodiments of the present invention are not limited to the above-mentioned technical subject matters, and other technical subject matters not mentioned in the above-mentioned description may be easily appreciated by those skilled in the art to which the present invention pertains without difficulty.

In order to solve the above technical problems, a method for controlling interference by a transmitter of a wireless communication system with multiple antennas comprises generating a base codebook subset including at least one precoding matrix selected from a base codebook; transmitting a base codebook subset indication, which represents the at least one precoding matrix included in the base codebook subset, to a receiver; and precoding data using the base codebook subset or the base codebook.

In this case, the base codebook subset is generated by according precoding matrix index information received from neighbor cells.

Also, the precoding matrix index information is information of indexes of precoding matrixes which the neighbor cells request the transmitter to use or/and not to use.

Also, the base codebook subset indication is broadcasted.

In another aspect of the present invention, a method of controlling interference by a transmitter of a wireless communication system with multiple antennas comprises receiving information of indexes of precoding matrixes which neighbor cells request the transmitter to use or/and not to use; selecting a base codebook subset among predetermined base codebook subsets by considering the information of indexes; and transmitting an index of the selected base codebook subset to a receiver.

In this case, the method comprises precoding data using precoding matrixes included in the selected base codebook subset rotationally.

In other aspect of the present invention, a method of controlling interference by a receiver of a wireless communication system with multiple antennas comprises receiving a base codebook subset indication representing at least one precoding matrix included in a base codebook subset from a transmitter, wherein the base codebook subset includes at least one precoding matrix selected from a base codebook, receiving indication information indicating whether the receiver use the base codebook or the base codebook subset to the receiver, selecting a precoding matrix from the base codebook or the base codebook subset according to the indication information; and transmitting identification information of the selected precoding matrix to the transmitter.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 is a schematic view illustrating a transmitter which embodiments of the present invention can be applied to.

DETAILED DESCRIPTION OF THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. For convenience of description and better understanding of the present invention, some parts unrelated to the inventive concept of the present invention will be omitted herein. Wherever possible, the same reference numbers will be used throughout the drawings to refer to the same or like parts.

In the whole part of the specification of the present invention, if it is assumed that a certain part includes a certain component, the term 'including' means that a corresponding component may further include other components unless a specific meaning opposed to the corresponding component is written. In addition, another term ' . . . part', " . . . unit', 'module' or the like means a unit for processing at least one function or operation, and this unit may be implemented by hardware, software, or a combination thereof.

Figure 1:
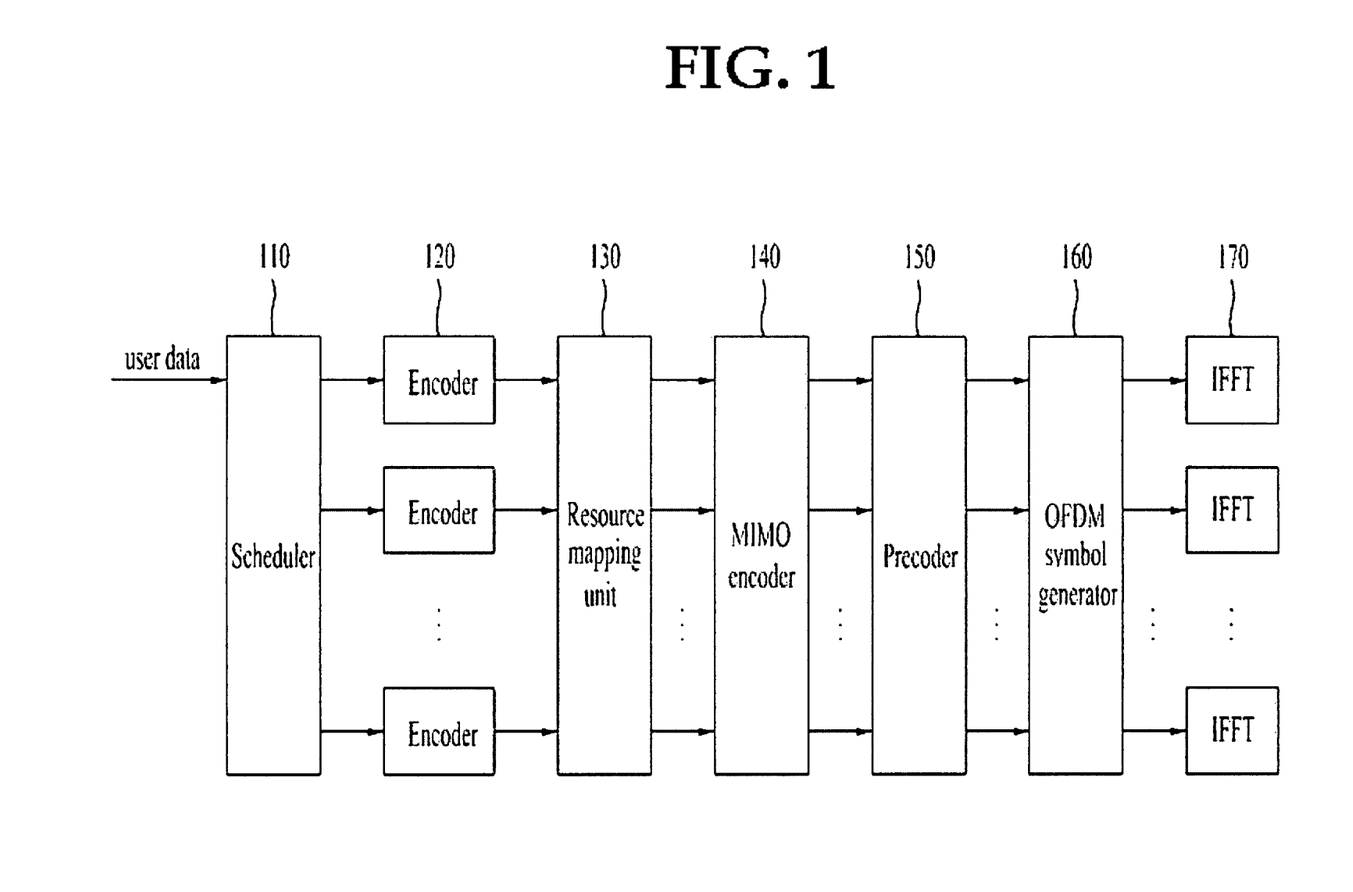

A transmitter, which embodiments of the present invention can be applied to, will hereinafter be described with reference to FIG. 1. FIG. 1 is a schematic view illustrating a transmitter which embodiments of the present invention can be applied to.

As illustrated in FIG. 1, a transmitter includes a scheduler 110, an encoder 120, a resource mapping unit 130, a MIMO encoder 140, a precoder 150, an OFDM (Orthogonal Frequency Division Multiplexing) symbol generator 160 and an inverse fast Fourier transformer (IFFT) 170.

The scheduler 110 determines various elements related to resource allocation to user data. That is, The scheduler 110 determines a resource allocation type, a MIMO mode, a rank, a modulation and coding rate (MCS) level, a power boosting value, a SU (single user)-MIMO or a MU (multi user)-MIMO and so on. In a resource allocation type, there are provided a distributed resource allocation type and localized resource allocation type. And, in a MIMO mode, there are provided open-loop transmission scheme and closed-loop transmission scheme The encoder 420 channel-codes and modulates input data stream.

Performing channel coding, the encoder 420 adds parity bits to system bits so that a receiver can correct errors produced during data transmission. In channel coding scheme, there are convolution coding, turbo coding and Low Density Parity Check (LDPC) coding.

In modulation scheme, there are quadrature phase shift keying (QPSK), Qadrature Amplitude Modulation (QAM) and so on.

The resource mapping unit 430 maps modulated symbols to resources.

The MIMO encoder 440 multiple-antenna-encodes mapped data. Performing multiple-antenna-encoding, the MIMO encoder 440 treat data with predetermined scheme so that capacity, throughput and coverage of a system is enlarged, in case that data symbols are transmitted through multiple transmission antenna. In multiple-antenna-encoding, there are spatial multiplexing (SM), spatial division multiplexing (SDM), spatial frequency block coding (SFBC), spatial time block coding (STBC) and so on.

The precoder 450 multiply the MIMO encoded data by a precoding matrix and maps the data to a physical transmission antenna. In an open-loop multiple antenna system, data is precoded using a plurality of precoding matrixes included in a predetermined codebook rotationally. In a closed-loop multiple antenna system, a receiver selects an precoding matrix from a predetermined codebook and transmits the selected precoding matrix to a transmitter, and the transmitter precodes date with the selected precoding matrix.

The OFDM symbol generator 460 maps data to OFDM symbols and the IFFT 480 transforms data in frequency domain to data in time domain. Then, a transmitter transmits the data in time domain through a multiple antenna to a receiver.

A receiver receives signal from a transmitter. The received signal (x) is represented as equation 4.

$$X = HWiz + n \qquad \text{[equation 4]}$$

Herein, H represents channel between a transmitter and a receiver. n represents zero mean Gaussian noise and Wi represents precoding matrix used by a transmitter. Wi is a precoding matrix selected from a predetermined codebook or a precoding matrix made from a precoding matrix selected from the predetermined codebook. The predetermined codebook is represented as equation 5.

$$W = [W1\ W2 \ldots WN] \qquad \text{[equation 5]}$$

A codebook can include precoding matrixes for each rank. A rank is a number of data streams which can be transmitted through a multiple antenna at once.

Figure 2:
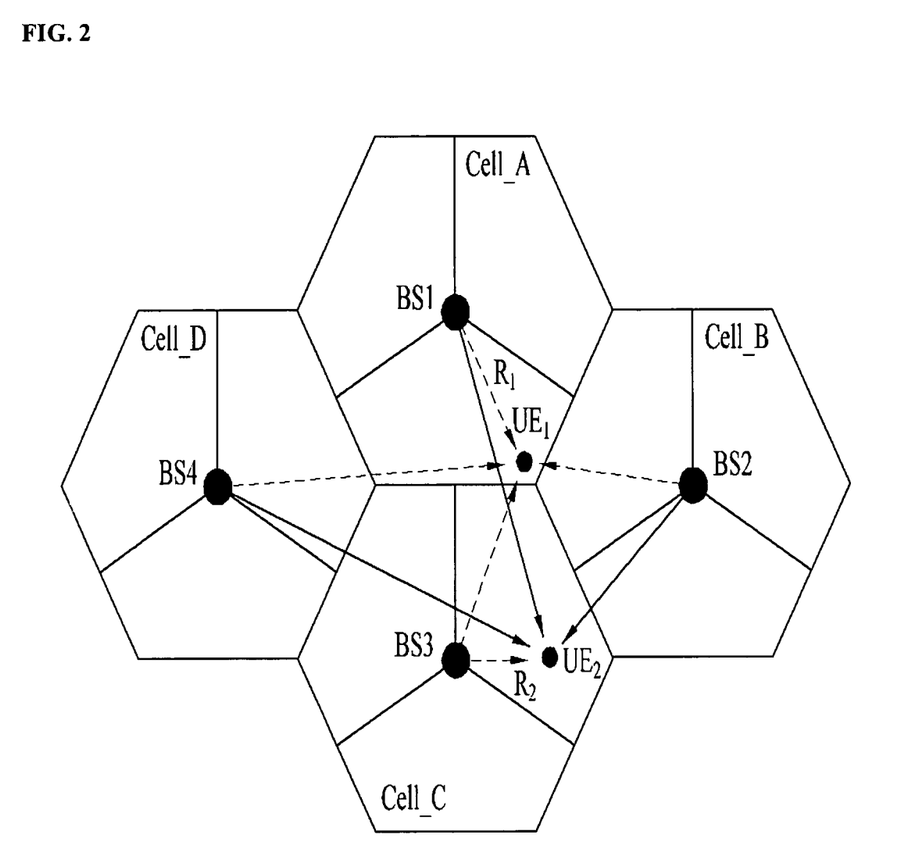
FIG. 2 illustrates inter-cell interference in multi-cell environment.

Next, status that inter-cell interference is produced by precoding matrixes in multi-cell environment will be described. FIG. 2 illustrates inter-cell interference in multi-cell environment In FIG. 2, signal (R1) received by first user equipment (UE1) in the edge of cell_A is very weak because the first user equipment is far from a serving base station (BS1). And, receiving performance of the first user equipment is very poor because the first user equipment is in boundary of neighbor cells (Cell_B, Cell_C, Cell_D) and receive interference from the neighbor cells. On the other hand, signal (R2) received by second user equipment (UE2) in the inside of cell_C is very strong because the second user equipment is close from a serving base station (BS3). The second user equipment receives interference from neighbor cells (Cell_A, Cell_B, Cell_D), but signals from neighbor cells are weak so that receiving performance is not deteriorated. Thus, performance of a user equipment in the edge of a cell is deteriorated more than that of an user equipment in the inside of a cell.

In multi-cell environment, base stations may use a same codebook. Precodig matrixes, which are used for each user equipment, have correlation each other because the precodig matrixes are not independent of each other. Or, beam patterns by precoding matrixes are overlapped and the beam patterns affect each other. Thus, a user equipment in the edge of a cell receives interference from precoding matrixes used to user equipments in neighbor cells.

Therefore, in embodiments of the present invention, a method of controlling interference will be proposed, wherein the method restricts use of precoding matrixes of neighbor cells.

A method of controlling interference according to embodiments of the present invention will hereinafter be described with reference to FIGS. 3 to 4.

In a method of controlling interference according to embodiments of the present invention, a receiver requests a transmitter of neighbor cells not to use precoding matrixes which give more interference than others to the receiver if the receiver receives interference from precoding matrixes of neighbor cells. Or, the receiver can request the transmitter to use precoding matrixes which give less interference than others to the receiver. That is, the receiver transmits first precoding matrixes indexes (PMIs) which the receiver request the transmitter of the neighbor cells not to use or second precoding matrixes indexes (PMIs) which the receiver request the transmitter of the neighbor cells to use. Then, excepting the first precoding matrixes indexes from a base codebook, and leaving the second precoding matrixes indexes in the base codebook, the transmitter generates a new codebook and use the new codebook.

A case that a method of controlling interference according to embodiments of the present invention is apply to a open-loop multiple antenna system and a case that a method of controlling interference according to embodiments of the present invention is apply to a closed-loop multiple antenna system will be described.

First, a method of controlling interference according to embodiments of the present invention in a closed-loop multiple antenna system will be described with reference to FIG. 3. FIG. 3 is a flowchart representing a method of controlling interference according to embodiments of the present invention in a closed-loop multiple antenna system.

Figure 3:
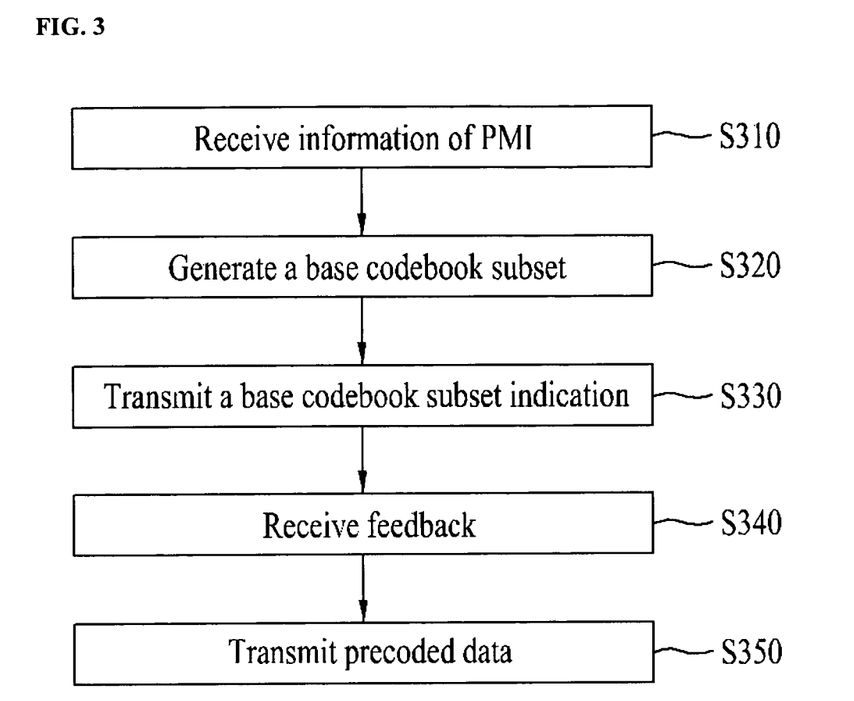
FIG. 3 is a flowchart representing a method of controlling interference according to embodiments of the present invention in a closed-loop multiple antenna system.

As illustrated in FIG. 3, a transmitter receives information of first precoding matrixes indexes which the neighbor cells request the transmitter to use or information of second precoding matrixes indexes which the neighbor cells request the transmitter not to use S310.

The transmitter receives the information of first precoding matrixes indexes or the information of second precoding matrixes indexes from a receiver or a transmitter of neighbor cells.

In case that the transmitter receives the information of first precoding matrixes indexes or the information of second precoding matrixes indexes from the receiver of neighbor cells, the transmitter receives the information through feedback channel. Herein, the feedback channel can be a common channel or a channel assigned to each cell. In case that the feedback channel can be a common channel, data can be distinguished using a specific code or a hopping signal for each cell so to reduce errors occurred by overlapping of data.

In case that the transmitter receives the information of first precoding matrixes indexes or the information of second precoding matrixes indexes from the transmitter of neighbor cells, the receiver of neighbor cell, which receives interference, transmits the information of first precoding matrixes indexes or the information of second precoding matrixes indexes to the transmitter of neighbor cell and the transmitter transmits the information of first precoding matrixes indexes or the information of second precoding matrixes indexes through backbone network to the transmitter.

The transmitter selects precoding matrixes from a base codebook and generates a base codebook subset including the selected precoding matrixes based on the received information of the first precoding matrixes indexes or the second precoding matrixes indexes S320. Excepting the first precoding matrixes indexes from a base codebook, and leaving the second precoding matrixes indexes in the base codebook, the transmitter generates a new codebook and use the new codebook.

Rank 1 precoding matrixes can give interference to neighbor cells most. So in embodiments of the present invention, a case that precoding matrixes which neighbor cells request to use or not to use are will be described for example. But the present invention is not limited to it.

For example, if a rank 1 base codebook is as equation 6 and the transmitter receives a request that requests not to use W1, W2, W7, the transmitter generates a codebook subset as equation 7.

$$W = [W0\ W1\ W2\ W3\ W4\ W5\ W6\ W7] \qquad \text{[equation 6]}$$

$$W = [W0\ W3\ W4\ W5\ W6] \qquad \text{[equation 7]}$$

The transmitter transmits a base codebook subset indication (BC_SI) and a codebook coordination enable (CCE) to a receiver S330. The base codebook subset indication can be transmitted through additional broadcast information and the codebook coordination enable can be transmitted through Feedback allocation IE (information element). At this time, a single user base codebook type (SU_CT) or a multi user base codebook type (MU_CT) can be transmitted through the additional broadcast information or through the feedback allocation IE. That is, a base codebook subset indication is broadcasted and a single user base codebook type and a multi user base codebook type are broadcasted or unicasted and a codebook coordination enable is unicasted.

A base codebook subset indication represents which precoding matrixes are included in a base codebook subset among a rank 1 base codebook or not. A base codebook subset indication can be expressed by bitmap. For example, if ith element of a base codebook subset indication expressed by bitmap is 0, a base codebook subset does not include ith element of a base codebook. And, if ith element of a base codebook subset indication expressed by bitmap is 1, a base codebook subset includes ith element of a base codebook. That is, a base codebook subset indication for a base codebook subset of equation 7 is "0b10011110".

A codebook coordination enable indicates whether the receiver use the base codebook or the base codebook subset.

For example, "0b0" requests the receiver to select a precoding matrix from a base codebook, and "0b1" requests the receiver to select a precoding matrix from a base codebook subset. When a specific receiver need to maximize a beam foaming gain for best performance, the transmitter transmits a codebook coordination enable "0b0" and the specific receiver selects a precoding matrix from a base codebook.

For example, if a number of antennas is 2 and a base codebook subset indication is "0b10011110", and a codebook coordination enable is "0b1" in a single-user closed loop MIMO system, a receiver excepts V(2, 1, 1), V(2, 1, 2) and V(2, 1, 7) from a base codebook and select a precoding matrix from the modified base codebook. Herein, V(Nt, Mt, i) is ith element of a rank Mt codebook when a number of antennas is Nt.

And, if a number of antennas is 2 and a base codebook subset indication is "0b10011110", and a codebook coordination enable is "0b0" in a single-user closed loop MIMO system, a receiver selects a precoding matrix from a base codebook.

A single user base codebook type (SU_CT) indicates which subset the receiver use among a plurality of single user base codebook subsets in a single-user closed loop MIMO system.

A multi user base codebook type (MU_CT) indicates which subset the receiver use among a plurality of multi user base codebook subsets in a multi-user closed loop MIMO system. For example, "0b0" requests a receiver to use 0th multi user base codebook subset, and "0b 1" requests a receiver to use 1th multi user base codebook subset.

For example, if a number of antennas is 2 and a base codebook subset indication is "0b10011110", and a codebook coordination enable is "0b1", and a multi user base codebook type is "0b0" in a multi-user closed loop MIMO system, a receiver excepts V(2, 1, 1), V(2, 1, 2) and V(2, 1, 7) from 0th multi user base codebook subset and select a precoding matrix from the modified 0th multi user base codebook subset. And, if a number of antennas is 2 and a base codebook subset indication is "0b 10011110", and a codebook coordination enable is "0b0" and a multi user base codebook type is "0b0" in a multi-user closed loop MIMO system, a receiver selects a precoding matrix from 0th multi user base codebook subset.

As described above, a receiver selects a precoding matrix from a codebook determined by a base codebook subset indication, a codebook coordination enable, a single user base codebook type, and a multi user base codebook type, and transmits identification information of the selected precoding matrix to a transmitter. Then, a transmitter receives the identification information of the selected precoding matrix S340. The identification information of the selected precoding matrix can be an index of the selected precoding matrix.

A transmitter generates a precoding matrix from the received identification information, and precodes data with the generated precoding matrix, and transmits the precoded data to a receiver S350.

Next, a method of controlling interference according to embodiments of the present invention in an open-loop multiple antenna system will be described with reference to FIG. 4. FIG. 4 is a flowchart representing a method of controlling interference according to embodiments of the present invention in an open-loop multiple antenna system.

Figure 4:
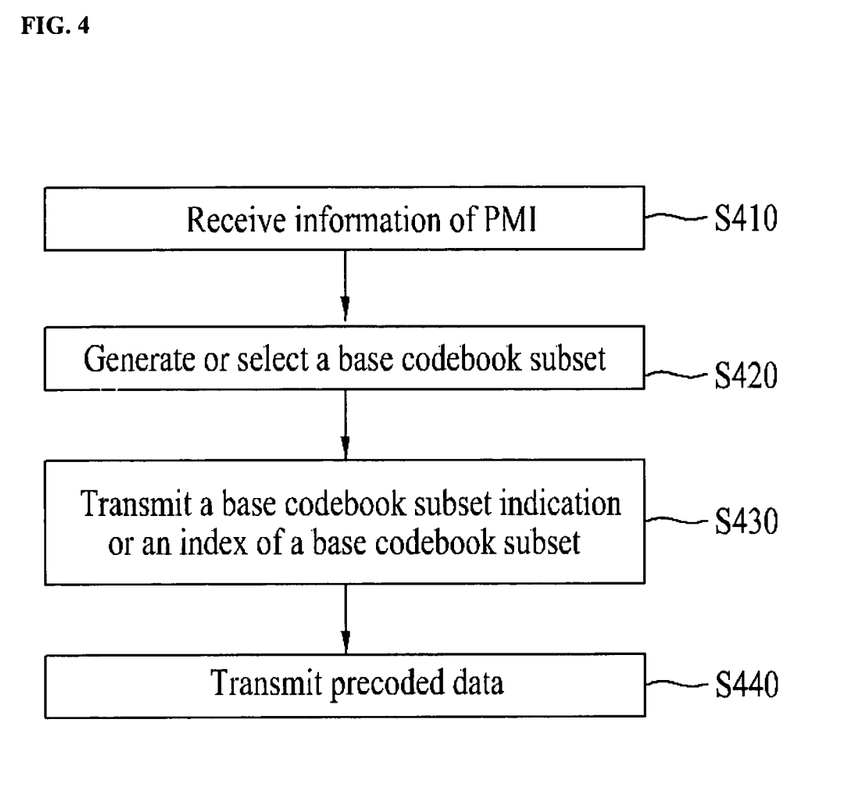
FIG. 4 is a flowchart representing a method of controlling interference according to embodiments of the present invention in an open-loop multiple antenna system.

As illustrated in FIG. 4, a transmitter receives information of first precoding matrixes indexes which the neighbor cells request the transmitter to use or information of second precoding matrixes indexes which the neighbor cells request the transmitter not to use S410. A step S410 is performed as a step S310.

Based on the received information of the first precoding matrixes indexes or the second precoding matrixes indexes, the transmitter generates a base codebook subset or selects a subset among predetermined base codebook subsets S420.

First, a case that a transmitter generates a base codebook subset will be described. For example, in case that a rank a base codebook is A={v1, v2, v3 . . . vn}, if a neighbor cell request not to use v1, a transmitter uses a base codebook subset A'={v2, v3 . . . vn} as a codebook. That is, when precoding data, a transmitter may use v2, v3 . . . vn rotationally in case that rank is 1, and precoding matrixes generated by combining v2, v3 . . . vn rotationally in case that rank is 2.

And, if neighbor cells request to use v2, v3, v4, a transmitter uses a base codebook subset A'={v2, v3, v4} as a codebook. That is, when precoding data, a transmitter may use v2, v3, v4 rotationally in case that rank is 1, and precoding matrixes generated by combining v2, v3, v4 rotationally in case that rank is 2. In other words, a transmitter precodes data using v2v3, v2v4, v3v4 rotationally in case that rank is 2, and a transmitter precodes data using v2v3v4 in case that rank is 3.

A transmitter must inform a receiver of used precoding matrixes. However, if a transmitter informs a receiver of used precoding matrixes for each rank, overhead will be increased. Therefore, if base codebook subsets are predetermined and a transmitter informs a receiver of an index of a used base codebook subset, overhead can be reduced. For example, predetermined base codebook subsets are as table 1.

TABLE 1

| indexes of a used codebook subsets | rank 1 | rank 2 | rank 3 | rank 4 |
|---|---|---|---|---|
| 1 | {v1, v2, v3, v4} | {v1v2, v2v3, v3v4, v4v1} | {v1v2v3, v2v3v4, v3v4v1, v4v1v2} | {v1v2v3v4, v2v3v4v1, v3v4v1v2, v4v1v2v3} |
| 2 | {v2, v3, v4, v5} | {v2v3, v3v4, v4v5, v5v2} | {v2v3v4, v3v4v5, v4v5v2, v5v2v3} | {v2v3v4v5, v3v4v5v2, v4v5v2v3, v5v2v3v4} |

In case that predetermined codebook subsets are as table 1, a transmitter may select a base codebook subset 1 if a neighbor cell requests not to use v5, and a transmitter selects a base codebook subset 2 if a neighbor cell requests not to use v1.

A transmitter transmits a base codebook subset indication to a receiver when generating a base codebook subset and a transmitter transmits an index of a selected base codebook subset to a receiver when selecting a base codebook subset from predetermined base codebook subsets S430.

In open-loop system, a receiver does not transmit feedback for a precoding matrix and a transmitter uses precoding matrixes of a codebook rotationally. However, a receiver needs a codebook used by a transmitter when calculating channel quality indicator (CQI). Therefore, a transmitter must inform a receiver a used codebook.

A base codebook subset indication represents which precoding matrix a transmitter use or not. A base codebook subset indication can be expressed by bitmap.

For example, ith element of a base codebook subset indication expressed by bitmap is 0 if a transmitter does not use ith precoding matrix of a base codebook, and ith element of a base codebook subset indication expressed by bitmap is 1 if a transmitter uses ith precoding matrix of a base codebook. That is, if a base codebook is A={v1, v2, v3, v4} and a base codebook subset used by a transmitter is A'={v1, v2, v3}, a base codebook subset is "0b1110".

A transmitter transmits an index of a selected base codebook subset to a receiver when selecting a base codebook subset from predetermined base codebook subsets. For example, if a transmitter selects a base codebook subset 1 of table 1, a transmitter transmits 1 (an index of a base codebook subset 1) to a receiver.

As described above, a transmitter precodes data using precoding matrixes of a generated or selected codebook subset rotationally.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit may be located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are contained in the scope of the present invention.

It is apparent that the present invention may be embodied by a combination of claims which do not have an explicit cited relation in the appended claims or may include new claims by amendment after application.

According to the embodiments of the present invention, the following advantages can be obtained.

First of all, since a base codebook subset generated effectively is used, performance of a wireless communication system is improved.

Second, since precoding matrixes which neighbor cells request not to use are not used, interference to neighbor cells is reduced.

Third, since base codebook subsets are generated previously and a transmitter transmits an index of a base codebook subset to a receiver, overhead is reduced.

It is to be understood that the advantages that can be obtained by the present invention are not limited to the aforementioned advantages and other advantages which are not mentioned will be apparent from the following description to the person with an ordinary skill in the art to which the present invention pertains.

What is claimed is:

1. A method of controlling interference by a transmitter in a wireless communication system, the method comprising:
   transmitting, by the transmitter, a base codebook subset indication which indicates a base codebook subset including at least one precoding matrix selected from a base codebook;
   transmitting, by the transmitter, indication information indicating whether a receiver is to use the base codebook or the base codebook subset to the receiver; and
   receiving, by the transmitter, identification information of a precoding matrix selected by the receiver from the receiver,
   wherein the precoding matrix selected by the receiver is within the base codebook when the indication information indicates that the receiver is to use the base codebook, and the precoding matrix selected by the receiver is within the base codebook subset when the indication information indicates that the receiver is to use the base codebook subset.

2. The method according to claim 1, wherein the base codebook subset indication is broadcast, and the indication information is unicast to the receiver.

3. The method according to claim 1, further comprising:
   precoding data to be transmitted to the receiver based on the identification information.

4. The method according to claim 1, further comprising:
   transmitting, to the receiver, single-user base codebook type information indicating that the receiver is to transmit the identification information using a codebook defined for a single-user closed loop MIMO.

5. The method according to claim 1, further comprising:
   transmitting, to the receiver, multi-user base codebook type information indicating that the receiver is to transmit the identification information using a codebook defined for a multi-user closed loop MIMO.

6. The method according to claim 1, further comprising:
   receiving, from one or more receivers, precoding matrix information indicating one or more precoding matrixes which the one or more receivers want a transmitter of a neighbor cell to use or/and not to use,
   wherein transmitting the base codebook subset indication transmits the base codebook subset indication by considering the precoding matrix information.

7. A method of controlling interference by a receiver in a wireless communication system, the method comprising:
   receiving, by the receiver, a base codebook subset indication indicating a base codebook subset including at least one precoding matrix selected from a base codebook from a transmitter;
   receiving, by the receiver, indication information indicating whether the receiver is to use the base codebook or the base codebook subset from the transmitter; and
   transmitting, by the receiver, identification information of a precoding matrix selected from the base codebook or the base codebook subset to the transmitter
   wherein the precoding matrix is selected from the base codebook when the indication information indicates that the receiver is to use the base codebook, and the precoding matrix is selected from the base codebook subset when the indication information indicates that the receiver is to use the base codebook subset.

8. The method according to claim 7, wherein the base codebook subset indication is broadcast by the transmitter, and the indication information is unicast by the transmitter to the receiver.

9. The method according to claim 7, further comprising:
   receiving, from the transmitter, single-user base codebook type information indicating that the receiver is to transmit the identification information using a codebook defined for a single-user closed loop MIMO.

10. The method according to claim 7, further comprising:
    receiving, from the transmitter, multi-user base codebook type information indicating that the receiver is to transmit the identification information using a codebook defined for a multi-user closed loop MIMO.

11. The method according to claim 1, wherein the base codebook from which the at least one precoding matrix of the base codebook subset is selected is a codebook defined for rank-1.

12. The method according to claim 7, wherein the base codebook from which the at least one precoding matrix of the base codebook subset is selected is a codebook defined for rank-1.

13. The method according to claim 7, further comprising: transmitting, to the transmitter, precoding matrix information indicating one or more precoding matrixes which the receiver wants a transmitter of a neighbor cell to use or not to use.

14. The method according to claim 13, wherein the base codebook subset indication is transmitted from the transmitter to the receiver based on the precoding matrix information.

15. A transmitter for controlling interference in a wireless communication system, the transmitter comprising:

multiple antennas; and a processor configured to control the multiple antennas to transmit a base codebook subset indication which indicates a base codebook subset including at least one precoding matrix selected from a base codebook, to transmit indication information indicating whether a receiver is to use the base codebook or the base codebook subset to the receiver, and to receive identification information of a precoding matrix selected by the receiver from the receiver, wherein the precoding matrix selected by the receiver is within the base codebook when the indication information indicates that the receiver is to use the base codebook, and the precoding matrix selected by the receiver is within the base codebook subset when the indication information indicates that the receiver is to use the base codebook subset.

16. A receiver for controlling interference in a wireless communication system, the receiver comprising:

at least one antenna; and a processor configured to control the at least one antenna to receive a base codebook subset indication indicating a base codebook subset including at least one precoding matrix selected from a base codebook from a transmitter, to receive indication information indicating whether the receiver is to use the base codebook or the base codebook subset from the transmitter, and to transmit identification information of a precoding matrix selected from the base codebook or the base codebook subset to the transmitter, wherein the processor is configured to select the precoding matrix from the base codebook when the indication information indicates that the receiver is to use the base codebook and select the precoding matrix from the base codebook subset when the indication information indicates that the receiver is to use the base codebook subset.

* * * * *